(12) United States Patent
Kato et al.

(10) Patent No.: US 11,939,485 B2
(45) Date of Patent: Mar. 26, 2024

(54) LIQUID-REPELLENT STRUCTURE, PRODUCTION METHOD THEREFOR, PACKAGING MATERIAL, AND SEPARATION SHEET

(71) Applicant: TOPPAN INC., Tokyo (JP)

(72) Inventors: Ryoji Kato, Tokyo (JP); Kosuke Kinoshita, Tokyo (JP); Yu Ogihara, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 17/841,906

(22) Filed: Jun. 16, 2022

(65) Prior Publication Data

US 2022/0348785 A1 Nov. 3, 2022

Related U.S. Application Data

(63) Continuation of application No. PCT/JP2020/045933, filed on Dec. 9, 2020.

(30) Foreign Application Priority Data

Dec. 19, 2019 (JP) ................................. 2019-229219

(51) Int. Cl.
    *C09D 127/12* (2006.01)
    *B05D 7/00* (2006.01)
    (Continued)

(52) U.S. Cl.
    CPC ........... *C09D 127/12* (2013.01); *B05D 7/546* (2013.01); *B65D 65/42* (2013.01); *C09D 5/002* (2013.01);
    (Continued)

(58) Field of Classification Search
    CPC ........ C09D 127/12; C09D 5/002; C09D 7/67; C09D 7/68; C09D 7/69; C09D 7/70;
    (Continued)

(56) References Cited

U.S. PATENT DOCUMENTS

| | | | | |
|---|---|---|---|---|
| 2014/0147627 A1* | 5/2014 | Aizenberg | ................ | F15D 1/02 428/141 |
| 2015/0210951 A1* | 7/2015 | Aizenberg | ............... | B05D 5/08 141/1 |

(Continued)

FOREIGN PATENT DOCUMENTS

| | | |
|---|---|---|
| CN | 108778733 A | 11/2018 |
| EP | 2 942 380 A1 | 11/2015 |

(Continued)

OTHER PUBLICATIONS

Translation of JP-5350741-B2, Isobe et al., Nov. 2013 (Year: 2013).*

(Continued)

*Primary Examiner* — Nathan L Van Sell
(74) *Attorney, Agent, or Firm* — Foley & Lardner LLP

(57) ABSTRACT

A liquid-repellent structure includes a surface to which liquid repellency is to be imparted; a foundation layer having a surface and disposed to face the surface to which liquid repellency is to be imparted; and a liquid-repellent layer disposed to face the surface of the foundation layer, wherein the foundation layer contains an acid-modified polyolefin, the liquid-repellent layer contains a fluorine-containing resin and particles, and the fluorine-containing resin contains a hydrophilic structural unit having at least one of an amino group and an amide group. A packaging material has the liquid-repellent structure disposed to face a product. The packaging material can also be applied to a product that is a selected one of hand soap, body soap, shampoo, rinse, creams, and cosmetics and that contains a surfactant.

16 Claims, 3 Drawing Sheets

(51) Int. Cl.
*B65D 65/42* (2006.01)
*C09D 5/00* (2006.01)
*C09D 7/40* (2018.01)
*C09D 123/30* (2006.01)

(52) U.S. Cl.
CPC ............. *C09D 7/67* (2018.01); *C09D 7/68* (2018.01); *C09D 7/69* (2018.01); *C09D 7/70* (2018.01); *C09D 123/30* (2013.01)

(58) Field of Classification Search
CPC .. C09D 123/30; C09D 5/1681; C09D 5/1693; C09D 123/0853; C09D 123/0869; C09D 7/66; C09D 139/04; C09D 201/025; C09D 201/04; B05D 7/546; B05D 5/083; B05D 2201/00; B05D 2601/22; B05D 2602/00; B05D 7/52; B65D 65/42; B65D 65/40; B32B 27/08; B32B 27/32; B32B 2255/10; B32B 2255/26; B32B 2307/7265; B32B 27/36; B32B 2250/24; B32B 2439/60; C08J 7/042; C08J 7/043; C08J 2367/02; C08J 2423/08; C08J 2427/12; C08K 3/22; C08K 3/346; C08K 3/36

See application file for complete search history.

(56) References Cited

U.S. PATENT DOCUMENTS

| | | | |
|---|---|---|---|
| 2018/0318877 A1* | 11/2018 | Parkin | B05D 5/08 |
| 2021/0129508 A1 | 5/2021 | Kato et al. | |
| 2022/0033156 A1 | 2/2022 | Matukawa et al. | |

FOREIGN PATENT DOCUMENTS

| | | |
|---|---|---|
| EP | 3 431 284 A1 | 1/2019 |
| JP | 2017-013353 A | 1/2017 |
| JP | 2017-132055 A | 8/2017 |
| JP | 2017-155183 A | 9/2017 |
| JP | 6522841 B1 | 5/2019 |
| JP | 2021-000820 A | 1/2021 |
| WO | WO-2017/204258 A1 | 11/2017 |
| WO | WO-2019/244752 A1 | 12/2019 |

OTHER PUBLICATIONS

Extended European Search Report issued in connection with EP Appl. Ser. No. 20902142.7 dated Dec. 14, 2022 (8 pages).
International Searching Authority, "International Search Report," issued in connection with International Patent Application No. PCT/JP2020/045933, dated Feb. 9, 2021, 7 pages.
International Searching Authority, "Written Opinion," issued in connection with International Patent Application No. JP2020/045933, dated Feb. 9, 2021, 4 pages.
Office Action issued in corresponding Chinese Patent Application No. 202080086804.1 dated Nov. 28, 2023 (16 pages).

* cited by examiner

From the viewpoint of improved or even excellent liquid repellency, it is preferred that the particles contained in the liquid-repellent layer include scale-like particles having an average primary particle size of 0.1 to 6 μm, different ones of the scale-like particles constituting respective aggregates. The liquid-repellent layer may contain spherical particles in addition to or instead of the scale-like particles. The foundation layer may contain a filler. The average primary particle size as used herein means the value specified in the catalog for the particles or the average of the values obtained by measuring the major axis length and minor axis length of 10 randomly selected particles in the SEM field of view, and dividing the sum by 2.

LIQUID-REPELLENT STRUCTURE, PRODUCTION METHOD THEREFOR, PACKAGING MATERIAL, AND SEPARATION SHEET

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/045933, filed on Dec. 9, 2020, which in turn claims the benefit of Japanese Patent Application No. 2019-229219, filed on Dec. 19, 2019, the disclosures of which are incorporated herein by reference in their entirety.

TECHNICAL FIELD

The present disclosure relates to a liquid-repellent structure and a method for producing the same, as well as a packaging material and a separation sheet, both of which have the liquid-repellent structure disposed to face a product.

BACKGROUND ART

Various modes are known for structures having water repellency. For example, PTL 1 discloses a water-repellent structure including, on the surface of a substrate, a fine particle layer having scale-like inorganic fine particles fixed by a binder, and a water-repellent film layer covering the surface of the fine particle layer. PTL 2 discloses a single-layer water-repellent heat seal film including a thermoplastic resin and hydrophobic particles. PTL 3 discloses a water-repellent laminate for cover materials, including a base and a thermal bonding layer on the base, where the thermal bonding layer contains a thermoplastic resin, water-repellent fine particles, and bead particles having a larger average particle diameter than the water-repellent fine particles.

CITATION LIST

Patent Literature

PTL 1: JP 2017-132055 A;
PTL 2: JP 2017-155183 A;
PTL 3: WO2017/204258.

BACKGROUND

The present invention relates generally to the field of

SUMMARY OF THE INVENTION

Technical Problem

According to the study conducted by the present inventors, there is room for improvement in the conventional liquid-repellent structures in terms of durability. That is, the liquid repellency of the conventional liquid-repellent structures is initially sufficient but decreases over time. This decrease is presumed to be because the insufficient adhesion between a liquid-repellent layer and a surface on which the liquid-repellent layer is located causes the liquid-repellent layer to be separated from the surface or fine particles in the liquid-repellent layer to be detached therefrom.

The present disclosure provides a liquid-repellent structure having improved or even excellent liquid repellency for a sufficiently long time, and a method for producing the same. Further, the present disclosure also provides a packaging material and a separation sheet, both of which have the above liquid-repellent structure disposed to face a product.

Solution to Problem

A liquid-repellent structure according to one aspect of the present disclosure includes a surface to which liquid repellency is to be imparted; a foundation layer having a surface and disposed to face the surface to which liquid repellency is to be imparted; and a liquid-repellent layer disposed to face the surface of the foundation layer, wherein the foundation layer contains an acid-modified polyolefin, the liquid-repellent layer contains a fluorine-containing resin and particles, and the fluorine-containing resin contains a hydrophilic structural unit having at least one of an amino group and an amide group.

Conventionally, excellent liquid repellency is known to be exhibited in a liquid-repellent layer by a chemical action derived from a fluorine-containing resin and a physical action derived from asperities due to particles. However, for a liquid-repellent layer containing a fluorine-containing resin having a perfluoroalkyl group (Rf group), its low surface energy due to the Rf group makes it difficult to increase the adhesion between the liquid-repellent layer and a surface to which liquid repellency is to be imparted. For this reason, the conventional liquid-repellent structures decrease in liquid repellency over time, as described above. In this respect, the present inventors found that a liquid-repellent structure has improved or even excellent liquid repellency for a sufficiently long time when a surface to which a liquid repellency is to be imparted and a liquid-repellent layer have a foundation layer there between that contains a specific thermoplastic resin (acid-modified polyolefin) and the liquid-repellent layer contains a fluorine-containing resin that includes a structural unit having a specific group (at least one of an amino group and an amide group). This is considered to be because the strong adhesion between the foundation layer and the liquid-repellent layer is exhibited by the interaction between the acid-modified part of the acid-modified polyolefin contained in the foundation layer and a hydrophilic structural unit of the fluorine-containing resin contained in the liquid-repellent layer.

The fluorine-containing compound contained in the liquid-repellent layer may not contain a structural unit derived from pyrrolidone nor a derivative of pyrrolidone (hereinafter, sometimes referred to as "pyrrolidones"). Further, the liquid-repellent layer as a whole may not contain structural units derived from pyrrolidones. Structural units derived from pyrrolidones may be contained in fluorine compounds (fluorine additives) to improve the adhesion between the fluorine compounds and their underlying layers (e.g., paper) in oil-resistant paper etc., which require excellent oil resistance, and to stabilize the dispersion of the fluorine compounds in water. However, in the case of coming into contact with highly viscous liquids containing surfactants etc., the liquid repellency may be reduced due to the interaction between the surfactants etc. and the structural units derived from pyrrolidones. Some fluorine-containing resins contain structural units derived from pyrrolidones, and when such a fluorine-containing resin is used, the effect of improving liquid repellency may not be sufficient for highly viscous liquids containing surfactants etc. In contrast, when the fluorine-containing resin, and further the entire liquid-repellent layer, does not contain structural units derived from pyrrolidones, particularly improved or even excellent liquid repellency to highly viscous liquids containing surfactants etc. can be achieved.

The present disclosure provides a packaging material and a separation sheet, both of which have the above liquid-repellent structure disposed to face a product. The packaging material and the separation sheet can be applied to a product that is a selected one of hand soap, body soap, shampoo, rinse, creams, and cosmetics and that contains a surfactant. The packaging material and the separation sheet can also be applied to products containing water (e.g., water, beverages, and yogurt), products containing oil (e.g., curry, fresh cream), and viscous products (e.g., hair creams).

The present disclosure provides a method for producing the liquid-repellent structure described above. The method for producing the liquid-repellent structure includes the steps of: forming a foundation layer on a surface to which liquid repellency is to be imparted; preparing a coating liquid for forming a liquid-repellent layer; forming a coating film of the coating liquid on a surface of the foundation layer; and drying the coating film.

Advantageous Effects of the Invention

The present disclosure provides a liquid-repellent structure having improved or even excellent liquid repellency for a sufficiently long time, and a method for producing the same. Further, the present disclosure also provides a packaging material and a separation sheet, both of which have the above liquid-repellent structure disposed to face a product.

DETAILED DESCRIPTION

Description of the Embodiments

Embodiments of the present disclosure will be described in detail below with reference to the accompanying drawings. The present invention is not limited to the embodiments described below. In the following description, the same elements or elements having the same functions will be denoted by the same reference signs, and redundant description will be omitted. In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

First Embodiment

<Liquid-repellent structure>

Figure 1:
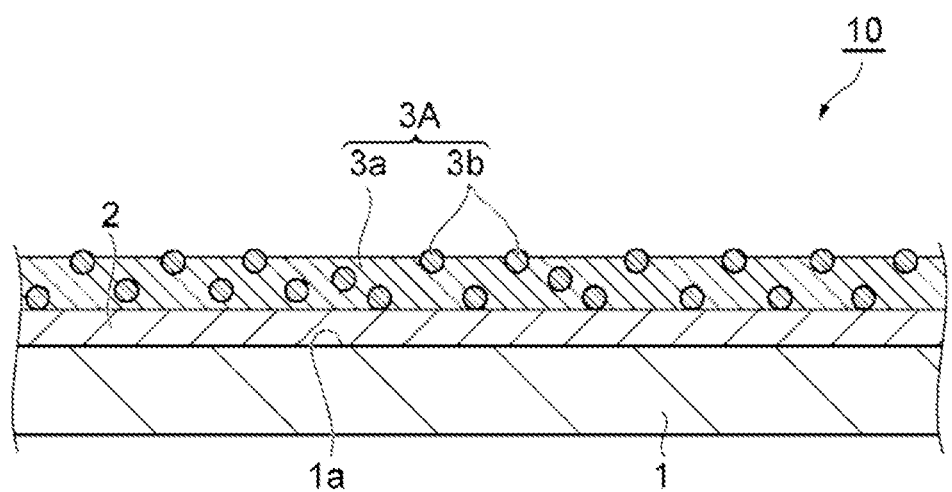
FIG. 1 is a schematic cross-sectional view illustrating a first embodiment of a liquid-repellent structure according to the present disclosure.

FIG. 1 is a schematic cross-sectional view illustrating a liquid-repellent structure according to a present embodiment. As shown in FIG. 1, the liquid-repellent structure 10 includes a substrate 1 having a treatment surface 1a (surface to which liquid repellency is to be imparted), a foundation layer 2 disposed on the treatment surface 1a, and a liquid-repellent layer 3A disposed on a surface of the foundation layer 2.

(Substrate)

The substrate 1 is not particularly limited as long as it has a surface to which liquid repellency is to be imparted and serves as a support. For example, the substrate 1 may be a film-like substrate (thickness: about 10 to 200 μm) or a plate-like substrate (thickness: about 1 to 10 mm). Examples of film-like substrates include paper, resin films, metal foil, and the like. When the inner surface of a film packaging material made of such a material is used as a treatment surface 1a, and a foundation layer 2 and a liquid-repellent layer 3A are formed thereon, it is possible to obtain a packaging bag to which contents are less likely to adhere. Examples of plate-like substrates include paper, resin, metal, glass, and the like. When the inner surface of a container formed by molding such a material is used as a treatment surface 1a, and a foundation layer 2 and a liquid-repellent layer 3A are formed thereon, it is possible to obtain a container to which contents are less likely to adhere.

Examples of the paper include high-quality paper, special high-quality paper, coated paper, art paper, cast-coated paper, imitation paper, kraft paper, and the like. Examples of the resins include polyolefin, acid-modified polyolefin, polyester (e.g., polyethylene terephthalate (PET)), polyethylene (PE), polypropylene (PP), polyamide (PA), polyvinyl chloride (PVC), cellulose acetate, cellophane resin, and the like. Examples of the metal include aluminum, nickel, and the like.

The melting point of the substrate 1 is preferably 170° C. or lower. In this case, when a packaging bag is formed by heat sealing, the adhesion between the substrate 1 and the foundation layer 2 becomes stronger, so that the heat sealing properties are further improved. From such a viewpoint, the melting point of the substrate 1 is more preferably 150° C. or lower. The melting point of the substrate 1 can be measured by differential scanning calorimetry.

(Foundation layer)

The foundation layer 2 is disposed between the substrate 1 and the liquid-repellent layer 3A. The foundation layer 2 is formed to partially or completely cover the surface of the substrate 1 (the treatment surface 1a). With the foundation layer 2 interposed between the substrate 1 and the liquid-repellent layer 3A, the adhesion between the substrate 1 and the liquid-repellent layer 3A and its durability can be further enhanced.

The foundation layer 2 contains an acid-modified polyolefin. The foundation layer 2 may also contain a filler as needed. The modified polyolefin may be obtained, for example, by graft-modifying a polyolefin with an unsaturated carboxylic acid, an unsaturated carboxylic acid anhydride, or an unsaturated carboxylic acid ester. For a monomer as a raw material used for synthesis of polypropylene, a small amount of ethylene or butene, for example, may be used as a second or third component.

The foundation layer 2 may contain a filler (not illustrated). The foundation layer 2 containing a filler can have appropriate asperities on its surface. These asperities produce an anchoring effect of further improving the adhesion of the foundation layer 2 to the liquid-repellent layer 3A. The filler contained in the foundation layer 2 may, for example, have an average primary particle size of 5 to 100 μm. From the viewpoint of achieving the liquid repellency of the liquid-repellent structure 10 and its durability at a higher level, the filler contained in the foundation layer 2 preferably has an average primary particle size of 10 to 30 μm. The filler contained in the foundation layer 2 may have spherical, scale-like, or any other shape. The content of the filler in the foundation layer 2 may be, for example, preferably 30 to 90 parts by mass and more preferably 75 to 90 parts by mass relative to the total mass of the foundation layer 2.

Examples of the material constituting the filler include inorganic materials such as silica, talc, mica, titanium oxide, calcium carbonate, barium sulfate, zinc oxide, smectite, zeolite, and aluminum oxide, and resin materials such as polyethylene and acrylic resin. As the filler, for example, the following commercial products can be used. Examples of commercial products of silica fillers include Sunsphere produced by AGC Si-Tech Co., Ltd and HS-304 produced by Nippon Steel Chemical & Material Co., Ltd. Examples of commercial products of titanium oxide fillers include AEROXIDE $TiO_2$ produced by Evonik Degussa. Examples of commercial products of aluminum oxide fillers include AEROXIDE Alu produced by Evonik Degussa. Examples of commercial products of polyethylene fillers include Flo-Beads produced by Sumitomo Seika Chemicals Co., Ltd. Examples of commercial products of acrylic resin fillers include Art Pearl produced by Negami Chemical Industrial Co., Ltd.

The thickness of the foundation layer 2 may be, for example, preferably 0.1 to 30 μm, more preferably 0.5 to 5 μm, and even more preferably 1 to 3 μm. When the thickness of the foundation layer 2 is 0.1 μm or more, the adhesion thereof to the liquid-repellent layer 3A tends to increase. On the other hand, when the thickness of the foundation layer 2 is 30 μm or less, asperities tend to be efficiently formed in the case where the foundation layer 2 contains a filler.

The mass per unit area of the foundation layer 2 may be, for example, preferably 0.1 to 30.0 $g/m^2$, more preferably 2 to 10 $g/m^2$, and even more preferably 3 to 8 $g/m^2$. When the mass per unit area of the foundation layer 2 is 0.1 $g/m^2$ or more, the adhesion thereof to the liquid-repellent layer 3A tends to increase. On the other hand, when the mass per unit area of the foundation layer 2 is 30 $g/m^2$ or less, the adhesion of asperities thereof to the liquid-repellent layer 3A can be efficiently obtained in the case where the foundation layer 2 contains a filler.

The foundation layer 2 may contain other additives as needed. Examples of other additives include flame retardants, slip agents, anti-blocking agents, antioxidants, light stabilizers, tackifiers, and the like.

The foundation layer 2 can be formed by preparing a coating liquid containing an acid-modified polyolefin, components to be added as needed (e.g., a filler and other additive), and a solvent, applying the coating liquid to the substrate 1 to form a coating film, and drying the coating film. Examples of solvents include water, alcohol, organic solvents, and the like. The acid-modified polyolefin may be in the form of an emulsion dispersed in water, alcohol, or the like. Such an emulsion may be prepared with a method of emulsifying a polymer produced by a polymerization reaction of a corresponding monomer or may be prepared by emulsion polymerization of a corresponding monomer.

As a method of applying the coating liquid to the substrate 1, a known method can be used without particular limitation. Examples thereof include an immersion method (dipping method), or methods that use a sprayer, a coater, a printer, a brush, or the like. In addition, examples of the types of coaters and printers used in these methods, and the coating methods thereof may include a gravure coater, a reverse-roll coater, a micro gravure coater, a combined chamber and doctor coater, an air-knife coater, a dip coater, a bar coater, a comma coater, a die coater, and the like for a direct gravure method, a reverse gravure method, a kiss reverse gravure method, an offset gravure method, and the like. The coating amount of the coating liquid can be appropriately adjusted so that the resulting foundation layer 2 has the above-mentioned thickness.

(Liquid-repellent layer)

The liquid-repellent layer 3A has liquid repellency and is formed to partially or completely cover the surface of the foundation layer 2. Liquid repellency is a concept including both water repellency and oil repellency, and is specifically a property of repelling liquid, semi-solid, or gel-like aqueous or oily materials. Examples of aqueous or oily materials include foods, such as water, oil, yogurt, curry, fresh cream, jelly, custard pudding, syrup, rice porridge, and soup; detergents, such as hand soap and shampoo; pharmaceuticals, cosmetics, chemicals, and the like. In the liquid-repellent structure 10, the liquid-repellent layer 3A forms the innermost layer or the outermost layer so as to come into direct contact with these materials.

The liquid-repellent layer 3A contains a fluorine-containing resin 3a and spherical particles 3b dispersed in the resin 3a. The spherical particles 3b illustrated in FIG. 1 are particles having a spherical shape. The spherical particles 3b preferably have an average primary particle size of, for example, 5 nm to 30 μm. From the viewpoint of achieving the liquid repellency of the liquid-repellent structure 10 and its durability at a higher level, the average primary particle size of the spherical particles 3b is more preferably 5 to 5000 nm and even more preferably 5 to 1000 nm. The content of the spherical particles 3b in the liquid-repellent layer 3A may be, for example, preferably 30 to 90 parts by mass and more preferably 50 to 80 parts by mass relative to the total mass of the liquid-repellent layer 3A.

The spherical particles 3b may be composed of the same material as the filler of the foundation layer 2. Examples of commercial products of silica fine particles include AEROSIL produced by Nippon Aerosil Co., Ltd., and SEAHOSTAR produced by Nippon Shokubai Co., Ltd. These particles have an average primary particle size of 100 nm or less.

The fluorine-containing resin 3a is at least a copolymer of a fluorine-containing monomer and a monomer containing a hydrophilic structural unit having at least one of an amino group and an amide group. The total amount of the monomer containing a hydrophilic structural unit may be, for example, preferably 0.01 to 12 mmol/g, more preferably 0.1 to 3 mmol/g, and even more preferably 0.5 to 2 mmol/g.

As the fluorine-containing resin 3a, a compound having a perfluoroalkyl, perfluoroalkenyl or perfluoropolyether structure or the like can be used as appropriate. As the fluorine-containing resin 3a, a commercially available fluorine paint can be used. Examples of the commercially available fluorine paint include AsahiGuard AG-E060 produced by AGC Inc., and Unidyne TG-8811 produced by Daikin Industries, Ltd. The content of the fluorine-containing resin 3a in the liquid-repellent layer 3A may be, for example, preferably 10 to 70 parts by mass and more preferably 20 to 50 parts by mass relative to the total mass of the liquid-repellent layer 3A.

The fluorine-containing resin 3a may not contain a structural unit derived from pyrrolidone nor a derivative thereof (pyrrolidones), from the viewpoint of further improving the liquid repellency to highly viscous liquids containing surfactants etc. (e.g., hand soap, body soap, shampoo, rinse, creams, and cosmetics). Here, examples of pyrrolidones include N-vinyl-2-pyrrolidone, N-vinyl-3-methyl-2-pyrrolidone, N-vinyl-5-methyl-2-pyrrolidone, N-vinyl-3, 3-dimethyl-2-pyrrolidone, and the like. Example of fluorine compounds that do not contain structural units derived from pyrrolidones include AsahiGuard AG-E060, AG-E070, and AG-E090 produced by AGC Inc., and Unidyne TG-8111 produced by Daikin Industries, Ltd.

The liquid-repellent layer 3A may contain a thermoplastic resin other than the fluorine-containing resin 3a. The content of the thermoplastic resin other than the fluorine-containing resin 3a in the liquid-repellent layer 3A may be, for example, preferably 3 to 50 parts by mass and more preferably 5 to 15 parts by mass relative to the total mass of the liquid-repellent layer 3A. Examples of the thermoplastic resin other than the fluorine-containing resin 3a include low density polyethylene, medium density polyethylene, high density polyethylene, ethylene-α olefin copolymer, homo, block, or random polypropylene, propylene-α olefin copolymer, ethylene-vinyl acetate copolymer, and the like.

The liquid-repellent layer 3A may contain other additives as needed within a range that does not impair the liquid-repellent function. Examples of other additives include flame retardants, slip agents, anti-blocking agents, antioxidants, light stabilizers, tackifiers, and the like.

The thickness of the liquid-repellent layer 3A may be, for example, preferably 0.05 to 20 μm, more preferably 0.5 to 20 μm, and even more preferably 1 to 5 μm. When the thickness of the liquid-repellent layer 3A is 0.05 82 m or more, it is possible to sufficiently prevent the spherical particles 3b from detaching from the liquid-repellent layer 3A, and improved or even excellent liquid repellency can be achieved. On the other hand, when the liquid-repellent layer 3A has a thickness of 20 μm or less, appropriate asperities are easily formed on its surface due to the spherical particles 3b. The liquid-repellent layer 3A can be formed using the same method as for the foundation layer 2. That is, the solvent used for the coating liquid, the coating liquid coating method, and the coating film drying method are the same as those for forming the foundation layer 2.

The liquid-repellent structure 10 has improved or even excellent liquid repellency for a sufficiently long time. This is considered to be because the strong adhesion between the foundation layer 2 and the liquid-repellent layer 3A is exhibited by the interaction between the acid-modified part of the acid-modified polyolefin contained in the foundation layer 2 and a hydrophilic structural unit of the fluorine-containing resin 3a contained in the liquid-repellent layer 3A.

<Packaging material>

The packaging material according to the present embodiment has the liquid-repellent structure 10 disposed to face a product. The packaging material according to the present embodiment can be applied to products containing water (e.g., water, beverages, and yogurt) and products containing oil (e.g., curry, fresh cream), and can also be applied to a product that is a selected one of hand soap, body soap, shampoo, rinse, creams, and cosmetics. Specific examples of the packaging material include retort pouches for curry or pasta sauces, containers and lids for yogurt and custard pudding, containers or refill pouches for toiletries such as hand soap, shampoo, and rinse, and tubes for toothpaste and pharmaceuticals.

<Separation sheet>

The separation sheet according to the present embodiment has the liquid-repellent structure 10 disposed to face a product. The separation sheet according to the present embodiment can be applied to products containing water and products containing oil, and can also be applied to a product that is a selected one of hand soap, body soap, shampoo, rinse, creams, and cosmetics. More specifically, the separation sheet is placed between a lunch box lid and foodstuffs, and is used to prevent viscous materials (e.g., mayonnaise, tartar sauce, or ketchup) from adhering to the lunch box lid. The separation sheet may be, for example, placed on the inner surface of the lid of a container containing creams or cosmetics, and may also be used to prevent viscous materials (e.g., hair wax, moisturizing cream, or skin cream) from adhering to the lid of the container.

Second Embodiment

Figure 2:
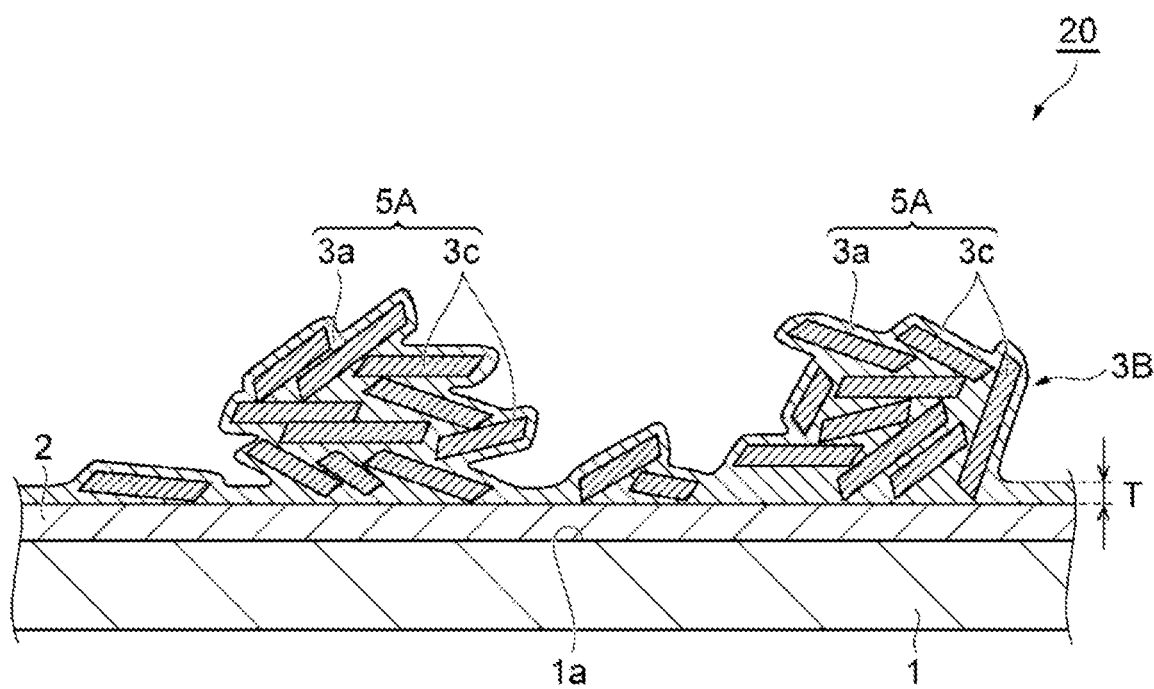
FIG. 2 is a schematic cross-sectional view illustrating a second embodiment of a liquid-repellent structure according to the present disclosure.

Whereas the liquid-repellent layer 3A contains spherical particles 3b in the first embodiment, it may alternatively contain scale-like particles. As shown in FIG. 2, a liquid-repellent structure 20 includes a substrate 1 having a treatment surface 1a, a foundation layer 2 disposed on the treatment surface 1a, and a liquid-repellent layer 3B disposed on a surface of the foundation layer 2. The liquid-repellent layer 3B contains a fluorine-containing resin 3a and scale-like particles 3c. The content of the scale-like particles 3c in the liquid-repellent layer 3B may be, for example, preferably 30 to 90 parts by mass and more preferably 50 to 80 parts by mass relative to the total mass of the liquid-repellent layer 3B.

As shown in FIG. 2, each aggregate 5A is comprised of a plurality of scale-like particles 3c and a fluorine-containing resin 3a covering these particles. The aggregates 5A form relatively large asperities on the surface of the liquid-repellent layer 3B.

The scale-like particles 3c can be present in the form of primary particles, secondary aggregates, or tertiary aggregates thereof. The secondary aggregates are formed in such a manner that the primary particles of the scale-like particles 3c are oriented in parallel and stacked in layers. The tertiary aggregates of the scale-like particles 3c are formed by crystal growth in each direction due to the irregular stacking of the primary particles and the secondary aggregates. The average primary particle size of the scale-like particles 3c may be, for example, preferably 0.1 to 6 μm, more preferably 0.1 to 4 μm, and even more preferably 4 to 6 μm. The aggregates 5A are easily formed when the average primary particle size of the scale-like particles 3c is 0.1 μm or more, whereas liquid repellency derived from the complex and fine shape of the scale-like particles 3c is sufficiently exhibited when the average primary particle size of the scale-like particles 3c is 6 μm or less.

Examples of the material constituting the scale-like particles 3c include silica, talc, mica, titanium oxide, calcium carbonate, barium sulfate, zinc oxide, smectite, zeolite, aluminum oxide, and the like. Examples of commercial products of scale-like silica include Sunlovely produced by AGC Si-Tech Co., Ltd. Examples of commercial products of scale-like mica include Repco Mica produced by Repco Inc. Examples of commercial products of scale-like aluminum oxide include Cerasur produced by Kawai Lime Industry Co., Ltd.

The thickness of the resin layer in the liquid-repellent layer 3B (thickness T in FIG. 2) may be, for example, preferably 0.05 to 10 μm, more preferably 0.5 to 10 μm, and more preferably 1 to 5 μm. When the thickness of the resin layer is 0.05 μm or more, it is possible to sufficiently prevent the scale-like particles 3c from detaching from the liquid-repellent layer 3B, and improved or even excellent liquid repellency due to the fluorine-containing resin 3a can be achieved. On the other hand, when the thickness of the resin layer is 10 μm or less, the complex and fine shape of the scale-like particles 3c is likely to appear on the surface of the liquid-repellent layer 3B, and improved or even excellent liquid repellency due to the scale-like particles 3c can be achieved.

Third Embodiment

Figure 3:
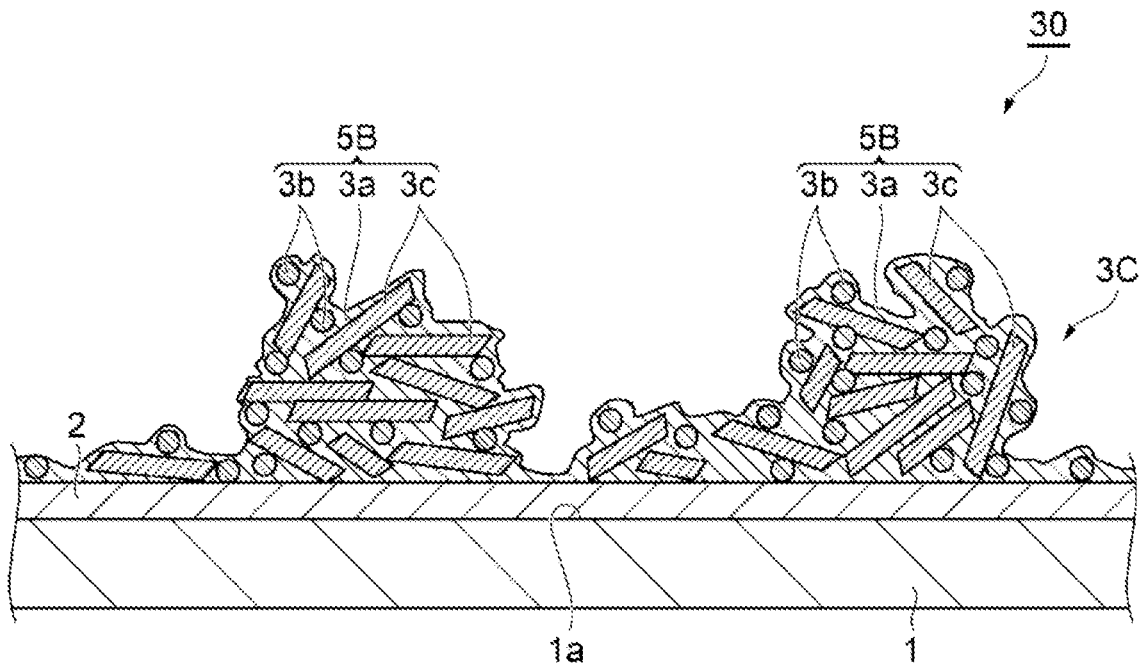
FIG. 3 is a schematic cross-sectional view illustrating a third embodiment of a liquid-repellent structure according to the present disclosure.

Whereas the liquid-repellent layer 3A contains spherical particles 3b in the first embodiment, it may alternatively contain both spherical particles 3b and scale-like particles 3c. As shown in FIG. 3, a liquid-repellent structure 30 includes a substrate 1 having a treatment surface 1a, a foundation layer 2 disposed on the treatment surface 1a, a liquid-repellent layer 3C disposed on a surface of the foundation layer 2. The liquid-repellent layer 3C contains a fluorine-containing resin 3a, spherical particles 3b, and scale-like particles 3c. As shown in FIG. 3, each aggregate 5B is comprised of a plurality of spherical particles 3b, a plurality of scale-like particles 3c, and a fluorine-containing resin 3a covering these particles.

The content of the spherical particles 3b in the liquid-repellent layer 3C may be, for example, preferably 1 to 90 parts by mass and more preferably 20 to 60 parts by mass relative to the total mass of the liquid-repellent layer 3C. The content of the scale-like particles 3c in the liquid-repellent layer 3C may be, for example, preferably 10 to 80 parts by mass and more preferably 15 to 30 parts by mass relative to the total mass of the liquid-repellent layer 3C.

By making combined use of spherical particles 3b and scale-like particles 3c having a larger particle size than the spherical particles 3b, spherical particles 3b can be interposed between primary particles of scale-like particles 3c (see FIG. 3). This can prevent the formation of excessively large aggregates due to excessive stacking (aggregation) of the primary particles of the scale-like particles 3c. The resin layer in the liquid-repellent layer 3C may have a thickness within the same range as for the liquid-repellent layer 3B.

EXAMPLES

The present disclosure will be described in more detail with reference to the following examples; however, the present invention is not limited to these examples.

The following materials were prepared to produce liquid-repellent structures.

<Substrate>
Polyethylene terephthalate (PET) film

<Thermoplastic Resin>
Acid-modified PO-1: Zaikthene A (trade name, carboxyl group-containing polyolefin, produced by Sumitomo Seika Chemicals Co., Ltd.).

Acid-modified PO-2: Zaikthene L (trade name, carboxyl group-containing polyolefin, produced by Sumitomo Seika Chemicals Co., Ltd.).

Acid-modified PO-3: Zaikthene N (trade name, carboxyl group-containing polyolefin, produced by Sumitomo Seika Chemicals Co., Ltd.).

Acid-modified PO-4: Unistole H200 (trade name, acid-modified polyolefin, produced by Mitsui Chemicals, Inc.).

Acid-modified PO-5: Arrowbase SB5230N (trade name, modified polyolefin, polyethylene skeleton, produced by Unitika Ltd.).

Acid-modified PO-6: Auroren AE-301 (trade name, special modified polyolefin, produced by Nippon Paper Industries Co., Ltd.,) p Acid-modified PO-7: Arrowbase SD5200 (trade name, modified polyolefin, polyethylene skeleton, produced by Unitika Ltd.).

Acid-modified PO-8: Arrowbase DA5010 (trade name, modified polyolefin, polypropylene skeleton, produced by Unitika Ltd.).

Ethylene-vinyl acetate copolymer: Sepolsion VA406N (trade name, produced by Sumitomo Seika Chemicals Co., Ltd., used for Comparative Example 1)

<Filler>
F-1: Sunsphere NP-100 (trade name, silica particles, produced by AGC Si-Tech Co., Ltd., average primary particle size: 10 μm)

F-2: Flo-Beads CL-2080 (trade name, polyethylene particles, produced by Sumitomo Seika Chemicals Co., Ltd., average primary particle size: 11 μm)

F-3: Art Pearl SE-010T (trade name, acrylic beads, produced by Negami Chemical Industrial Co., Ltd., average primary particle size: 10 μm)

F-4: Sunsphere NP-200 (trade name, silica particles, produced by AGC Si-Tech Co., Ltd., average primary particle size: 20 μm)

F-5: HS-304 (trade name, silica particles, produced by Nippon Steel Chemical & Material Co., Ltd., average primary particle size: 28 μm)

<Fluorine-containing resin>
FR-1: AsahiGuard AG-E060 (trade name, produced by AGC Inc., a compound that does not have structural units derived from pyrrolidones, a cationic water-based material, functional groups of the hydrophilic structural unit: hydroxyl groups and amino groups)

FR-2: Unidyne TG-8811 (trade name, produced by Daikin Industries, Ltd., a compound that has structural units derived from pyrrolidones, a cationic water-based material, functional groups of the hydrophilic structural unit: hydroxyl groups, amino groups, and a pyrrolidone structure (amide group))

FR-3: AsahiGuard AG-E090 (trade name, produced by AGC Inc., a compound that does not have structural units derived from pyrrolidones, an anionic water-based material, functional groups of the hydrophilic structural unit: hydroxyl groups and sulfo groups, used in comparative example 2)

<Spherical particles>
P-1: Sunsphere NP-30 (trade name, produced by AGC Si-Tech Co., Ltd., average primary particle size: 4 μm)

P-2: Sunsphere NP-100 (trade name, produced by AGC Si-Tech Co., Ltd., average primary particle size: 10 μm)

P-3: Sunsphere NP-200 (trade name, produced by AGC Si-Tech Co., Ltd., average primary particle size: 20 μm)

P-4: Epostar MX030W (trade name, an acrylic cross-linked particle, produced by Nippon Shokubai Co., Ltd., average primary particle size: 40 nm)

P-5: Seahostar KE-S100 (trade name, a silica particle, produced by Nippon Shokubai Co., Ltd., average primary particle size: 100 nm)

P-6: AEROSIL 300 (trade name, a silica particle, produced by Nippon Aerosil Co., Ltd., average primary particle size: 7 nm)

P-7: AEROSIL 200 (trade name, a silica particle, produced by Nippon Aerosil Co., Ltd., average primary particle size: 13 nm)

P-8: AEROSIL 50 (trade name, a silica particle, produced by Nippon Aerosil Co., Ltd., average primary particle size: 30 nm)

<Scale-like particles>

Q-1: Sunlovely (trade name, a scale-like silica, produced by AGC Si-Tech Co., Ltd., average primary particle size: 4 to 6 μm)

Q-2: Sunlovely LFS HN-150 (trade name, a scale-like silica, produced by AGC Si-Tech Co., Ltd., average primary particle size: 1.5 μm)

Q-3: Repco Mica M-XF (trade name, a scale-like mica, produced by Repco Inc., average particle size: 4 μm)

Q-4: Cerasur (trade name, a scale-like alumina filler, produced by Kawai Lime Industry Co., Ltd., average particle size: 9 μm)

<Solvent>

Alcoholic solvent: 2-propanol

<Production of liquid-repellent structure>

Respective thermoplastic resins and, as required, a filler were each added to a solvent (see Table 1). This solution was sufficiently stirred to prepare a foundation coating liquid.

A bar coater was used to form a coating film of the foundation coating liquid on the substrate. The coating film was dried by heating at 80° C. for 1 minute to form a foundation layer on the substrate. The coating amount was adjusted so that the mass per unit area of the foundation layer was 3.0 g/m$^2$.

A fluorine-containing resin and particles were added to a solvent (see Table 1). This solution was sufficiently stirred to prepare a coating liquid for liquid-repellent layer. A bar coater was used to form a coating film of the coating liquid for liquid-repellent layer on the foundation layer. The coating film was then dried by heating at 80° C. for 1 minute to form a liquid-repellent layer on the foundation layer. The coating amount was adjusted so that the mass per unit area of the liquid-repellent layer was 1.8 g/m$^2$.

TABLE 1

| | Foundation layer | | | | Liquid-repellent layer | | | | | |
|---|---|---|---|---|---|---|---|---|---|---|
| | Thermoplastic resin | | Filler | | Fluorine-containing resin | | Particle | | | |
| | Type | Parts by mass | Type | Parts by mass | Type | Parts by mass | Spherical particle | Parts by mass | Scale-like particle | Parts by mass |
| Example 1 | Acid-modified PO-1 | 100 | — | — | FR-1 | 50 | P-1 | 50 | — | — |
| Example 2 | Acid-modified PO-2 | 100 | — | — | FR-2 | 60 | P-2 | 40 | — | — |
| Example 3 | Acid-modified PO-3 | 100 | — | — | FR-1 | 70 | P-3 | 30 | — | — |
| Example 4 | Acid-modified PO-4 | 100 | — | — | FR-1 | 30 | P-4 | 70 | — | — |
| Example 5 | Acid-modified PO-5 | 100 | — | — | FR-2 | 40 | P-5 | 60 | — | — |
| Example 6 | Acid-modified PO-6 | 100 | — | — | FR-1 | 15 | P-6 | 85 | — | — |
| Example 7 | Acid-modified PO-7 | 100 | — | — | FR-2 | 20 | P-7 | 80 | — | — |
| Example 8 | Acid-modified PO-8 | 100 | — | — | FR-1 | 25 | P-8 | 75 | — | — |
| Comparative Example 1 | Ethylene-vinyl acetate copolymer | 100 | — | — | FR-1 | 25 | P-8 | 75 | — | — |
| Comparative Example 2 | Acid-modified PO-5 | 100 | — | — | FR-3 | 25 | P-8 | 75 | — | — |
| Example 9 | Acid-modified PO-5 | 100 | — | — | FR-1 | 50 | — | — | Q-1 | 50 |
| Example 10 | Acid-modified PO-5 | 100 | — | — | FR-2 | 30 | — | — | Q-2 | 70 |

TABLE 1-continued

| | Foundation layer | | | | Liquid-repellent layer | | | | | |
|---|---|---|---|---|---|---|---|---|---|---|
| | Thermoplastic resin | | Filler | | Fluorine-containing resin | | Particle | | | |
| | Type | Parts by mass | Type | Parts by mass | Type | Parts by mass | Spherical particle | Parts by mass | Scale-like particle | Parts by mass |
| Example 11 | Acid-modified PO-5 | 100 | — | — | FR-1 | 50 | — | — | Q-3 | 50 |
| Example 12 | Acid-modified PO-5 | 100 | — | — | FR-2 | 70 | — | — | Q-4 | 30 |
| Example 13 | Acid-modified PO-5 | 100 | — | — | FR-1 | 25 | P-6 | 30 | Q-1 | 45 |
| Example 14 | Acid-modified PO-5 | 100 | — | — | FR-2 | 25 | P-7 | 40 | Q-1 | 35 |
| Example 15 | Acid-modified PO-5 | 100 | — | — | FR-1 | 25 | P-8 | 50 | Q-1 | 25 |
| Example 16 | Acid-modified PO-5 | 100 | — | — | FR-2 | 40 | P-5 | 50 | Q-1 | 10 |
| Example 17 | Acid-modified PO-5 | 100 | — | — | FR-1 | 60 | P-1 | 20 | Q-1 | 20 |
| Example 18 | Acid-modified PO-5 | 100 | — | — | FR-2 | 70 | P-2 | 10 | Q-1 | 20 |
| Example 19 | Acid-modified PO-5 | 12 | F-1 | 88 | FR-2 | 25 | P-8 | 50 | Q-1 | 25 |
| Example 20 | Acid-modified PO-5 | 15 | F-2 | 85 | FR-2 | 25 | P-8 | 50 | Q-1 | 25 |
| Example 21 | Acid-modified PO-5 | 25 | F-3 | 75 | FR-2 | 25 | P-8 | 50 | Q-1 | 25 |
| Example 22 | Acid-modified PO-5 | 50 | F-4 | 50 | FR-2 | 25 | P-8 | 50 | Q-1 | 25 |
| Example 23 | Acid-modified PO-5 | 70 | F-5 | 30 | FR-2 | 25 | P-8 | 50 | Q-1 | 25 |
| Example 24 | Acid-modified PO-5 | 15 | F-2 | 85 | FR-1 | 25 | P-8 | 50 | Q-1 | 25 |
| Example 25 | Acid-modified PO-5 | 50 | F-4 | 50 | FR-1 | 25 | P-8 | 50 | Q-1 | 25 |
| Example 26 | Acid-modified PO-5 | 70 | F-5 | 30 | FR-1 | 25 | P-8 | 50 | Q-1 | 25 |

<Evaluation of liquid-repellent structure>

The liquid-repellent structures were evaluated as follows. The results are shown in Table 2.

(Liquid repellency evaluation)

The liquid-repellent structure was placed flat so that the surface on the liquid-repellent layer side was face-up, and 2 μL of each of the following liquids was dropped with a dropper onto the liquid-repellent layer. Subsequently, the liquid-repellent structure was allowed to stand vertically and left in that state for 30 seconds. Then, the state of the dropped liquid was visually observed.

[Liquids used]
Pure water
Salad oil: Nisshin Salad Oil (Nisshin OilliO)
Hand soap: Kurashi-More Medicated Hand Soap (Nihon Soap)
Shampoo 1: Jihada made kokochiyoku arau shampoo (SEVEN-ELEVEN JAPAN)
Shampoo 2: Shokubutsu no megumi de kami ni yasashii shampoo (SEVEN-ELEVEN JAPAN)

[Evaluation criteria]
5: The droplets rolled down from the surface of the liquid-repellent layer, or detached.
4: The liquid flowed down from the surface of the liquid-repellent layer, and no traces of liquid flow remained.
3: The liquid flowed down from the surface of the liquid-repellent layer, but traces of liquid flow remained in dots.
2: The liquid flowed down from the surface of the liquid-repellent layer, but traces of liquid flow remained in lines.
1: The liquid retained on the liquid-repellent layer and did not move, or soaked into the liquid-repellent layer.

(Adhesion evaluation)

The adhesion to viscous materials was evaluated in the following manner. A polypropylene (PP) film was placed flat, and 2 g of each of the following viscous materials was extracted with a medicine spoon and dropped on the PP film. The liquid-repellent structure was arranged so that the surface on the liquid-repellent layer side faced the PP film. The liquid-repellent structure was pressed against the viscous material at a load of 50 g/25 cm$^2$, and left in that state for 10 seconds. Subsequently, the liquid-repellent structure was peeled off, and the state of adhesion of the viscous material to the contact surface of the liquid-repellent layer in contact with the viscous material was visually observed. The adhesion was evaluated from the observation results based on the following evaluation criteria. It can be said that there is no practical problem if the evaluation results are 2 or higher. It is desirable that the evaluation results are 3 or higher.

[Viscous materials used]
Viscous material 1: Fresh cream extracted from Strawberry Shortcake (Family Mart)
Viscous material 2: Meiji Bulgaria Yogurt L81 Low Sugar (Meiji)
Viscous material 3: Uno Hybrid Hard (Shiseido)
Viscous material 4: Free Plus Moist Care Lotion (Kanebo Cosmetics)
Viscous material 5: Eaude Muge Medicated Skin Cream (Kobayashi Pharmaceutical)

[Evaluation criteria]
5: No adhesion of the viscous material to the contact surface was observed.
4: Adhesion of the viscous material to less than 10% of the area of the contact surface was observed.
Adhesion of the viscous material to 10% or more and less than 30% of the area of the contact surface was observed.
2: Adhesion of the viscous material to 30% or more and less than 70% of the area of the contact surface was observed.
1: Adhesion of the viscous material to 70% or more of the area of the contact surface was observed.

(Durability evaluation)

A Gakushin-Type Rubbing Tester (NR-100 type, manufactured by Daiei Kagaku Seiki Mfg. Co., Ltd.) was used to apply friction to the liquid-repellent layer of each liquid-repellent structure under the following conditions. This testing was performed as an alternative evaluation of whether the liquid-repellent layer would be detached from the liquid-repellent structure during post-processing or storage in a roll.

End of friction block: None attached
Load applied to testing surface: 2N
Speed of rubbing reciprocations: 30 reciprocation per minute
Number of rubbing reciprocations: 100 times The liquid-repellent structures after the rubbing test were subjected to the liquid repellency evaluation and adhesion evaluation as described above.

[Evaluation criteria]
Good: No difference in performance before and after the rubbing test
Poor: Performance deteriorated to such a level after the rubbing test that there is a practical problem

TABLE 2

| | Initial performance | | | | | | | | | | Performance after rubbing test | | | | | | | | | |
|---|---|---|---|---|---|---|---|---|---|---|---|---|---|---|---|---|---|---|---|---|
| | Liquid repellency evaluation | | | Adhesion evaluation | | | | | | Liquid repellency evaluation | | | Adhesion evaluation | | | | | |
| | Pure water | Hand Oil | Shampoo soap | 1 | 2 | Viscous material 1 | 2 | 3 | 4 | 5 | Pure water | Hand Oil | Shampoo soap | 1 | 2 | Viscous material 1 | 2 | 3 | 4 | 5 |
| Example 1 | 4 | 2 | 2 | 2 | 2 | 2 | 2 | 2 | 2 | 2 | Good | Good | Good | Good | Good | Good | Good | Good | Good | Good |
| Example 2 | 4 | 2 | 2 | 2 | 2 | 2 | 2 | 2 | 2 | 2 | Good | Good | Good | Good | Good | Good | Good | Good | Good | Good |
| Example 3 | 4 | 2 | 2 | 2 | 2 | 2 | 2 | 2 | 2 | 2 | Good | Good | Good | Good | Good | Good | Good | Good | Good | Good |
| Example 4 | 4 | 2 | 2 | 2 | 2 | 2 | 2 | 2 | 2 | 2 | Good | Good | Good | Good | Good | Good | Good | Good | Good | Good |
| Example 5 | 4 | 2 | 2 | 2 | 2 | 2 | 2 | 2 | 2 | 2 | Good | Good | Good | Good | Good | Good | Good | Good | Good | Good |

TABLE 2-continued

| | Initial performance | | | | | | | | | | Performance after nibbing test | | | | | | | | | |
|---|---|---|---|---|---|---|---|---|---|---|---|---|---|---|---|---|---|---|---|---|
| | Liquid repellency evaluation | | | Adhesion evaluation | | | | | | | Liquid repellency evaluation | | | Adhesion evaluation | | | | | | |
| | Pure water | Oil | Hand Shampoo soap | Viscous material | | | | | | | Pure water | Oil | Hand Shampoo soap | Viscous material | | | | | | |
| | | | | 1 | 2 | 1 | 2 | 3 | 4 | 5 | | | | 1 | 2 | 1 | 2 | 3 | 4 | 5 |
| Example 6 | 5 | 2 | 2 | 2 | 2 | 2 | 2 | 2 | 2 | 2 | Good | Good | Good | Good | Good | Good | Good | Good | Good | Good |
| Example 7 | 5 | 2 | 2 | 2 | 2 | 2 | 2 | 2 | 2 | 2 | Good | Good | Good | Good | Good | Good | Good | Good | Good | Good |
| Example 8 | 5 | 2 | 2 | 2 | 2 | 2 | 2 | 2 | 2 | 2 | Good | Good | Good | Good | Good | Good | Good | Good | Good | Good |
| Comparative Example 1 | 5 | 2 | 2 | 2 | 2 | 2 | 2 | 2 | 2 | 2 | Poor | Poor | Poor | Poor | Poor | Poor | Poor | Poor | Poor | Poor |
| Comparative Example 2 | 5 | 2 | 2 | 2 | 2 | 2 | 2 | 2 | 2 | 2 | Poor | Poor | Poor | Poor | Poor | Poor | Poor | Poor | Poor | Poor |
| Example 9 | 5 | 3 | 2 | 2 | 2 | 5 | 2 | 2 | 2 | 2 | Good | Good | Good | Good | Good | Good | Good | Good | Good | Good |
| Example 10 | 5 | 3 | 2 | 2 | 2 | 4 | 2 | 2 | 2 | 2 | Good | Good | Good | Good | Good | Good | Good | Good | Good | Good |
| Example 11 | 5 | 3 | 2 | 2 | 2 | 4 | 2 | 2 | 2 | 2 | Good | Good | Good | Good | Good | Good | Good | Good | Good | Good |
| Example 12 | 5 | 3 | 2 | 2 | 2 | 5 | 2 | 2 | 2 | 2 | Good | Good | Good | Good | Good | Good | Good | Good | Good | Good |
| Example 13 | 5 | 4 | 3 | 2 | 2 | 5 | 3 | 2 | 3 | 3 | Good | Good | Good | Good | Good | Good | Good | Good | Good | Good |
| Example 14 | 5 | 4 | 3 | 2 | 2 | 5 | 3 | 2 | 3 | 3 | Good | Good | Good | Good | Good | Good | Good | Good | Good | Good |
| Example 15 | 5 | 4 | 3 | 2 | 2 | 5 | 3 | 2 | 3 | 3 | Good | Good | Good | Good | Good | Good | Good | Good | Good | Good |
| Example 16 | 5 | 4 | 3 | 2 | 2 | 5 | 3 | 2 | 3 | 3 | Good | Good | Good | Good | Good | Good | Good | Good | Good | Good |
| Example 17 | 5 | 4 | 3 | 2 | 2 | 5 | 3 | 2 | 3 | 3 | Good | Good | Good | Good | Good | Good | Good | Good | Good | Good |
| Example 18 | 5 | 4 | 3 | 2 | 2 | 5 | 3 | 2 | 3 | 3 | Good | Good | Good | Good | Good | Good | Good | Good | Good | Good |
| Example 19 | 5 | 4 | 4 | 3 | 3 | 5 | 4 | 3 | 3 | 3 | Good | Good | Good | Good | Good | Good | Good | Good | Good | Good |
| Example 20 | 5 | 4 | 4 | 3 | 3 | 5 | 4 | 3 | 3 | 3 | Good | Good | Good | Good | Good | Good | Good | Good | Good | Good |
| Example 21 | 5 | 4 | 4 | 3 | 3 | 5 | 4 | 3 | 3 | 3 | Good | Good | Good | Good | Good | Good | Good | Good | Good | Good |
| Example 22 | 5 | 4 | 4 | 3 | 3 | 5 | 4 | 3 | 3 | 3 | Good | Good | Good | Good | Good | Good | Good | Good | Good | Good |
| Example 23 | 5 | 4 | 4 | 3 | 3 | 5 | 4 | 2 | 3 | 3 | Good | Good | Good | Good | Good | Good | Good | Good | Good | Good |
| Example 24 | 5 | 4 | 4 | 4 | 4 | 5 | 5 | 5 | 5 | 5 | Good | Good | Good | Good | Good | Good | Good | Good | Good | Good |
| Example 25 | 5 | 4 | 4 | 4 | 4 | 5 | 5 | 5 | 5 | 5 | Good | Good | Good | Good | Good | Good | Good | Good | Good | Good |
| Example 26 | 5 | 4 | 4 | 4 | 4 | 5 | 5 | 3 | 3 | 3 | Good | Good | Good | Good | Good | Good | Good | Good | Good | Good |

INDUSTRIAL APPLICABILITY

The present disclosure provides a liquid-repellent structure having improved or even excellent liquid repellency for a sufficiently long time, and a method for producing the same. Further, the present disclosure also provides a packaging material and a separation sheet, both of which have the above liquid-repellent structure disposed to face a product.

Reference Signs List

1 . . . Substrate; 1a . . . Treatment surface; 2 . . . Foundation layer; 3A, 3B, 3C . . . Liquid-repellent layer; 3a . . . Fluorine-containing resin; 3b . . . Spherical particle; 3c . . . Scale-like particle; 5A, 5B . . . Aggregate; 10, 20, 30 . . . Liquid-repellent structure.

What is claimed is:

1. A liquid-repellent structure, comprising:
a surface to which liquid repellency is to be imparted;
a foundation layer having a surface and disposed to face the surface to which liquid repellency is to be imparted; and
a liquid-repellent layer disposed to face the surface of the foundation layer,
wherein
the foundation layer contains an acid-modified polyolefin,
the liquid-repellent layer contains a fluorine-containing resin and particles,
the fluorine-containing resin contains a hydrophilic structural unit having at least one of an amino group and an amide group, and
the acid-modified polyolefin is obtained by graft-modifying a polyolefin with an unsaturated carboxylic acid, an unsaturated carboxylic acid anhydride, or an unsaturated carboxylic acid ester.

2. The liquid-repellent structure of claim 1, wherein the particles include scale-like particles having an average primary particle size of 0.1 to 6 different ones of the scale-like particles constituting respective aggregates.

3. The liquid-repellent structure of claim 1, wherein the liquid-repellent layer contains spherical particles having an average primary particle size of 5 to 1000 nm.

4. The liquid-repellent structure of claim 1, wherein the foundation layer contains a filler having an average primary particle size of 5 to 100 μm.

5. The liquid-repellent structure of claim 1, wherein the fluorine-containing resin does not contain a structural unit derived from pyrrolidone nor a derivative of pyrrolidone.

6. A packaging material for packaging a product, comprising:
the liquid-repellent structure of claim 1, the liquid-repellent structure being disposed to face the product.

7. The packaging material of claim 6, wherein the product is a selected one of hand soap, body soap, shampoo, rinse, creams, and cosmetics and contains a surfactant.

8. A separation sheet for covering a product, comprising:
the liquid-repellent structure of claim 1, the liquid-repellent structure being disposed to face the product.

9. The separation sheet of claim 8, wherein the product is a selected one of hand soap, body soap, shampoo, rinse, creams, and cosmetics and contains a surfactant.

10. The liquid-repellent structure of claim 1, wherein the surface to which liquid repellency is to be imparted is a surface of a substrate having a melting temperature of 170° C. or lower.

11. The liquid-repellent structure of claim 1, wherein the surface to which liquid repellency is to be imparted is a surface of a substrate having a melting temperature of 150° C. or lower.

12. The liquid-repellent structure of claim 1, wherein the fluorine-containing resin is a copolymer of a fluorine-containing monomer and a monomer containing a hydrophilic structural unit having at least one of an amino group and an amide group.

13. The liquid-repellent structure of claim 12, wherein a total amount of the monomer containing the hydrophilic structural unit in the fluorine containing resin is 0.01 to 12 mmol/g.

14. The liquid-repellent structure of claim 1, wherein the fluorine-containing resin does not contain a structural unit derived from pyrrolidone.

15. The liquid-repellent structure of claim 12, wherein the fluorine-containing resin does not contain a structural unit derived from pyrrolidone.

16. A method for producing the liquid-repellent structure of claim 1, comprising:
   forming the foundation layer on the surface to which liquid repellency is to be imparted;
   preparing a coating liquid for forming the liquid-repellent layer;
   forming a coating film of the coating liquid on the surface of the foundation layer; and
   drying the coating film.

* * * * *